United States Patent [19]

Kingsley et al.

[11] 4,045,675
[45] Aug. 30, 1977

[54] SOLID STATE RADIATION DETECTOR SYSTEM

[75] Inventors: Jack D. Kingsley, Schenectady; Henry H. Woodbury, Scotia, both of N.Y.

[73] Assignee: General Electric Company, Schenectady, N.Y.

[21] Appl. No.: 704,416

[22] Filed: July 12, 1976

[51] Int. Cl.$^2$ ............................................. G01T 1/24
[52] U.S. Cl. ..................................... 250/370; 250/205
[58] Field of Search ........................ 250/370, 371, 205

[56] References Cited

U.S. PATENT DOCUMENTS

| 2,938,003 | 5/1960 | Jacobs | 250/370 X |
| 3,479,455 | 11/1969 | Gebel | 250/371 X |
| 3,901,812 | 8/1975 | Hallengren | 250/205 X |
| 3,932,744 | 1/1976 | Anderson | 250/205 X |

Primary Examiner—Archie R. Borchelt
Attorney, Agent, or Firm—Geoffrey Krauss; Joseph T. Cohen; Jerome C. Squillaro

[57] ABSTRACT

A solid state radiation flux detector system utilizes a detector element, consisting of a bar of semiconductor having electrical conductance of magnitude dependent upon the magnitude of photon and charged particle flux impinging thereon, and negative feedback circuitry for adjusting the current flow through a light emitting diode to facilitate the addition of optical flux, having a magnitude decreasing in proportion to any increase in the magnitude of radiation (e.g. X-ray) flux incident upon the detector element, whereby the conductance of the detector element is maintained essentially constant. The light emitting diode also illuminates a photodiode to generate a detector output having a stable, highly linear response with time and incident radiation flux changes.

10 Claims, 4 Drawing Figures

U.S. Patent — Aug. 30, 1977 — 4,045,675
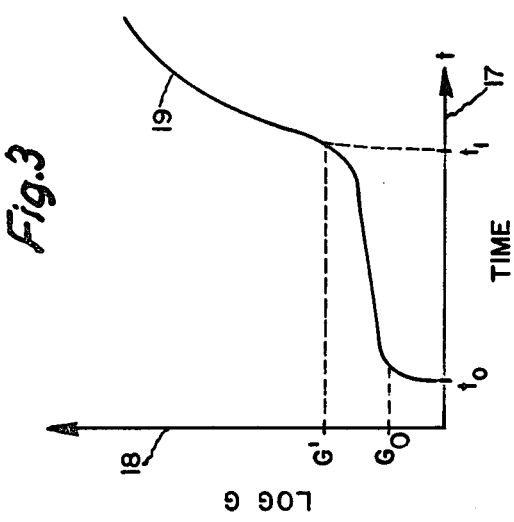
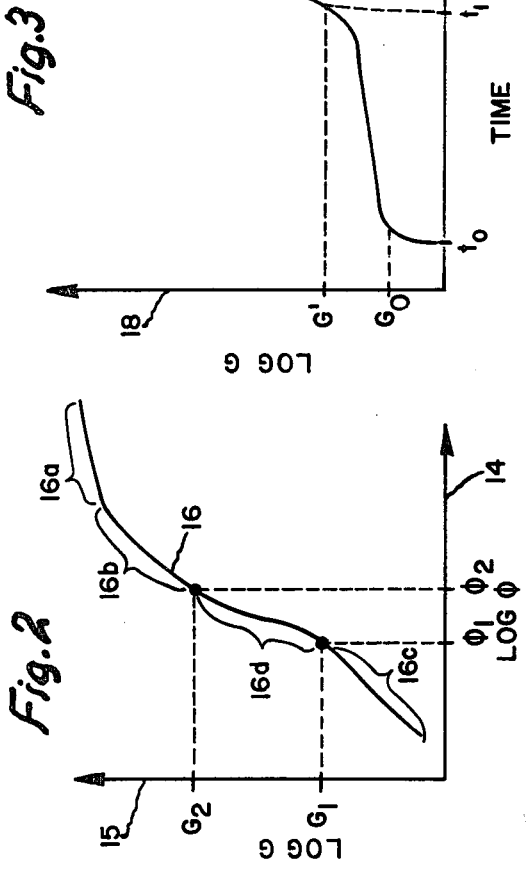
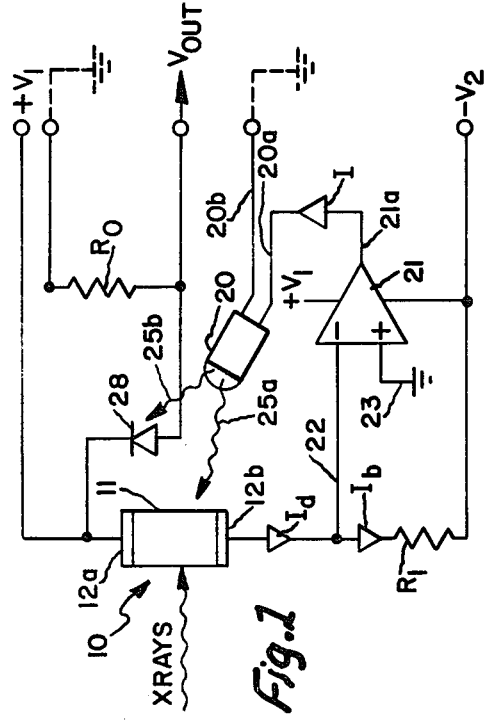
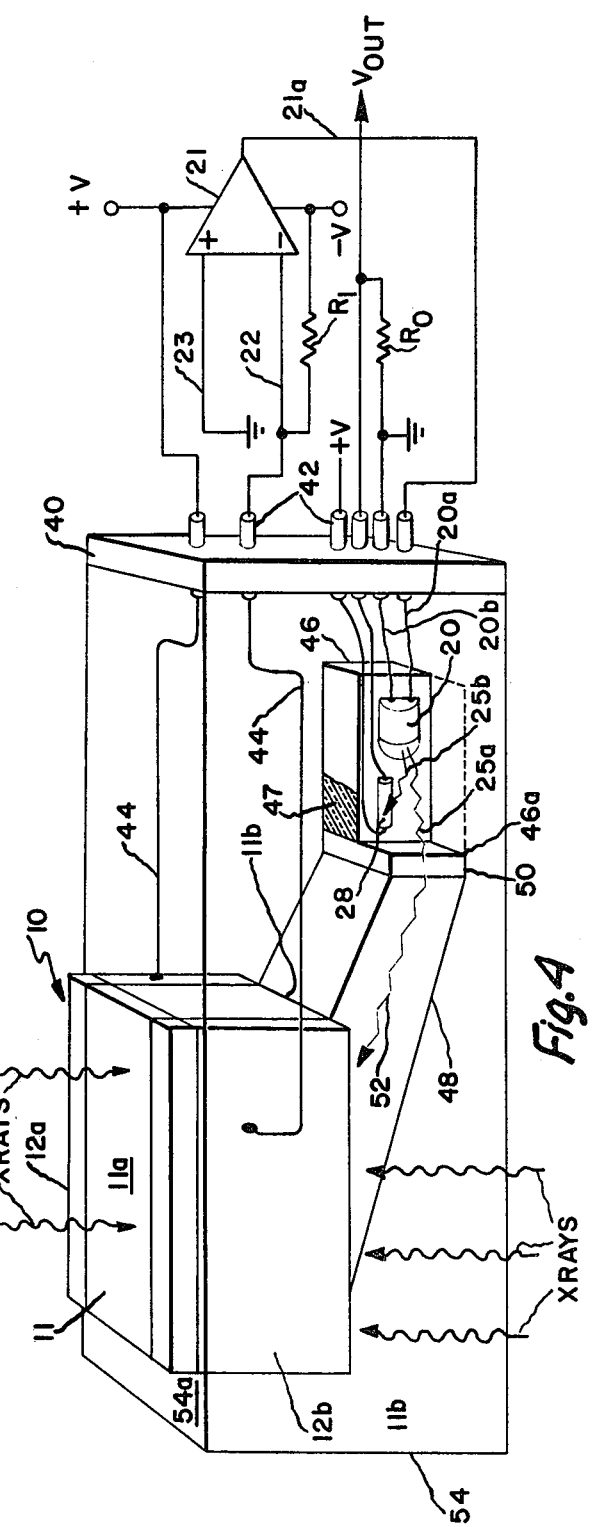

SOLID STATE RADIATION DETECTOR SYSTEM

BACKGROUND OF THE INVENTION

The present invention relates to stabilized radiation detection systems and, more particularly, to a novel solid state radiation detector system utilizing negative feedback to establish the magnitude of an additional optical flux incident upon a detector element to maintain the charged particle and photon-induced electrical conductivity therein at a substantially constant value.

X-ray flux measurement systems, such as applicable to computerized transaxial tomography systems and the like, require X-ray detectors advantageously of great simplicity, ruggedness and compactness. A desirable radiation detector should utilize a solid state device for highly efficient detection and to alleviate the possibility of damage due to physical shock and movement. Such a simple solid state X-ray flux detector device may be fashioned from a bar of cadmium selenide activated with sodium (CdSe:Na). The conductance of a bar of sodium-doped cadmium selenide is of very low magnitude when the bar is shielded from incident flux; upon illumination of the bar with X-ray or optical (visible and near-infrared) light flux, the conductivity thereof increases. The change in conductivity of the solid state detector device may be measured to provide a measurement of the magnitude of the incident X-ray flux, although the change in conductivity has generally been found to be highly non-linear relative to changes in the incident X-ray flux and to exhibit undesirable changes in conductivity with time and temperature, whereby a relatively poor quality signal, i.e., the conductivity change responsive to change in incident X-ray flux renders the single solid state detector generally unusable in most medical X-ray systems.

It is desirable to provide a detector system not only capable of detecting ionizing radiation, e.g. gamma rays, X-rays charged particles, near-infrared and the like, but also capable of stabilizing a solid state detection element, whereby the high noise equivalent absorption of the solid state device (relative to a gaseous absorbing device), engendered by the relatively greater density of the detector material, may be fully realized. It is also desirable to provide simple circuitry to facilitate stabilization of the detector with a relatively compact physical structure whereby arrays of the detector systems become more practical for computerized transaxial tomography systems so that rapid, pseudo-real-time imaging of moving organs such as the human heart and the like, is facilitated.

BRIEF SUMMARY OF THE DISCLOSURE

In accordance with the invention, a solid state radiation detector system, realizing the above-stated goals, comprises a detector element having an electrical parameter (conductivity) of magnitude varying in response to the total incident photon and charged particle flux thereon, means for comparing the varying magnitude of the parameter to a substantially constant selected value to generate an output proportional to the difference between the varying magnitude and the constant value; means, such as a light emitting diode and the like, for generating a flux of photons at wavelengths in the visible and near-infrared regions to impinge upon the detector element with magnitude proportional to the difference between the varying magnitude of the electrical parameter and the substantially constant selected value, whereby the electrical conductivity of the detector element is maintained substantially constant; and means intercepting a portion of the photon emission of the light emitting diode for generating a detector system output substantially proportional to the magnitude of X-ray flux incident upon the detector element.

In one preferred embodiment, a light pipe couples the optical photon-emitting device to the same surface of the detector element as receives incident X-ray flux. A thin filter element may be positioned between the light-emitting device and the input of the light pipe to transmit only those photons having wavelengths shorter than the filter cut-off wavelength, corresponding to the bandgap energy of detector material, the photons having energies greater than the bandgap energy being prevented from "pumping" the surface regions of the detector to reduce undesirable output variations therefrom.

Accordingly, it is one object of the present invention to provide a novel solid state radiation detector system having a substantially linear relation between incident radiation and charged particle flux and a system output.

It is another object of the present invention to provide a novel solid state system for detecting changes in incident X-ray flux and having a system output stabilized against time and temperature changes of the X-ray flux detector element.

These and other objects of the present invention will become clear to those skilled in the art upon consideration of the following detailed description and the drawings.

BRIEF DESCRIPTION OF THE DRAWINGS

FIG. 1 is a schematic diagram of a solid state radiation (X-ray) flux detector system in accordance with the principles of the present invention;

FIG. 2 is a graph illustrating the relation between the conductance and total incident photon flux for a solid state detector element utilizing one preferred semiconductor material;

FIG. 3 is a graph illustrating the time-dependent relationship of the same semiconductor material; and FIG. 4 is a partly-schematic, perspective side view of a detector head and the associated circuitry for one preferred detector system in accordance with the principles of the present invention.

DETAILED DESCRIPTION OF THE INVENTION

Referring initially to FIGS. 1, 2 and 3, in a preferred embodiment for the detection of X-ray photon flux, a solid state photon flux detector element 10 comprises an elongated bar 11 of a semiconductor material having an electrical parameter, e.g. conductivity, varying in response to the total incident photon flux thereon. A preferred semiconductor material is sodium-doped cadmium selenide(CdSe:Na), which may be formed by sealing a two gram bar of undoped CdSe in a quartz reactor tube to which 6 grams of selenium, "presaturated" with CdSe, and 13 milligrams of sodium have been added. The reactor tube is heated for approximately 64 hours at 750° C and is then "spun" in a centrifuge to throw off the liquid selenium during cooling periods. The resulting sodium-doped CdSe bar is cleaned and is then wetted with a mercury-indium amalgam before being contacted with indium solder to form an electrode 12 on each of a pair of opposed surfaces of the bar.

It should be understood that, while the present description is directed to one preferred embodiment of a system for detecting X-ray radiation, other types of ionizing radiation (such as gamma ray, near-infrared photons and the like) and fast charged particles can be detected by solid state detector element 10, which need not specifically be fabricated of CdSe:Na material.

Advantageously, detector element 10, fabricated according to the above method, exhibits a very low conductivity between electrodes 12 when shielded from incident photon flux. An increase in the total photon flux $\phi$ for photons having wavelengths from the X-ray region through the visible region and into the near-ultraviolet region, produces an increase in the conductivity G of the bar as measured between electrodes 12. As seen in FIG. 2, wherein increasing values of the logarithm of total flux (log $\phi$) lie along abscissa 14 and increasing values of the logarithm of conductivity (log G) lie along ordinate 15, the flux-conductivity ($\phi$-G) curve 16 exhibits a very nonlinear relation, typical of most column II-column VI compound photoconductors. As known, for incident total flux below a saturation level, at region 16a of the $\phi$-G curve, a pair of regions 16b and 16c, which are themselves nonlinear except over very narrow limits, exist respectively above and below a highly superlinear region 16d. In the superlinear region, changes of flux by a factor of 10, e.g., from $\phi_1$ (equal to 0.1 microwatt per square centimeter, in one particular detector element 10) to a flux $\phi_2$ (equal to one microwatt per square centimeter, in the same detector element) result in a conductivity change from respective values of $G_1 = 1 \times 10^{-12}$ mhos to a higher conductivity value $G_2 = 2 \times 10^{-9}$ mhos, yielding a conductivity range by a factor of about 2000. Greater and lesser changes in total incident photon flux yield respective greater and lesser changes in conductance, although the differential change of conductance with respect to flux is, as previously mentioned hereinabove, highly nonlinear. An electrical potential is impressed across electrodes 12 to cause a detector current $I_d$ to flow responsive to the conductivity of the semiconductor element 11; the generated current will, however, have the afore-mentioned nonlinear relationship to the magnitude of the total incident photon flux. The current, which may be monitored, does not provide a satisfactory output for use in medical diagnostic equipment due to the difficulty in normalizing and interpreting the highly non-linear signals.

Additionally, as seen in FIG. 3, wherein increasing values of time lie along abscissa 17 and increasing values of the logarithm of the conductivity (log G) lie along ordinate 18, the conductance-time curve 19 exhibits a desirable initial response time, on the order of 2 microseconds, for realization of an initial conductance value $G_0$ responsive to impingement of incident X-ray photon flux upon detector 10 from the "dark" (non-illuminated) state at time $t_0$. However, even maintaining a constant magnitude of photon illumination, the conductance of the detector element increases to a value G', greater than initial value $G_0$ after a short time interval $(t_1-t_0)$ of about 1–2 minutes, and even more rapidly increases for greater illumination time intervals. This time-dependent change of conductivity, coupled with the high non-linearity of the $\phi$-G curve, completely negates the desirable ruggedness and compactness aspects of the solid state detector element. This is especially true as a sodium-doped cadmium selenide photodetector is also known to show hysteresis and long-time sensitivity changes.

To advantageously utilize a sodium-doped cadmium selenide photodetector, having a high sensitivity and a fast initial time response, we have found that the detector element requires a constant energy excitation to avoid the nonlinearities, drifts and hysteresis mentioned hereinabove. A source 20 of optical photons, having wavelengths in the visible and/or near-infrared regions, provides additional excitation energy of a magnitude adjusted to cause the total excitation energy received by detector element 10 from both the externally produced incident-X-ray photons and the optical photons from emitter means 20 to be maintained at a substantially constant value. Advantageously, optical emitter means 20 is a light emitting diode (LED) emitting optical photons in response to a flow of current I therethrough. Current I is generated at the output 21a of a differential amplifier 21, energized by connection to at least the same electrical potential, $+V_1$, impressed across detector element 10, and preferably to a second electrical potential $(-V_2)$ of opposite polarity to and, generally, substantially equal magnitude as potential $V_1$-both voltages being referenced to zero potential (circuit ground). Differential amplifier 21 has an inverting input 22, coupled to one electrode 12b of detector element 10, and a non-inverting input 23 coupled to zero potential. A bias resistor $R_1$ is coupled between the second potential $(-V_2)$ and the common junction of amplifier input 22 and electrode 12b of detector element 10; electrode 12a is coupled to the first potential $(+V_1)$.

In operation, a voltage of substantially zero magnitude exists between amplifier inputs 22 and 23, whereby the bias current $I_b$ flowing from inverting input 22 is determined solely by the magnitude of the second potential $V_2$ and the preselected resistance of bias resistor $R_1$. The detector current $I_d$, as hereinabove mentioned, is proportional to the conductance G of the semiconductor member 11 and to the magnitude of first potential $V_1$. Utilization of a high input impedance at inverting input 22 (e.g. a FET input amplifier means 21) allows the operating conductance of detector element 10 to be established by selection of the resistance of resistor $R_1$ (proportional to the ratio of potentials $V_1$ and $V_2$).

Any change in the conductivity of detector element 10 (as by a change in incident X-ray photon flux) attempts to change the potential at inverting input 22, which change is amplified by the gain factor A of amplifier means 21 to vary the potential at output 21a, causing a changing amplitude of current flow I through photon emission means 20. The magnitude of optical photons 25 emitted by optical emitter means 20 is proportional to the magnitude of differential amplifier output current I. Thus, the optical photon flux incident upon detector element 11 is proportional to the voltage at input 22, i.e., the difference between the conductivities of the element detector and resistor $R_1$, whereby an increase in the magnitude of the incident X-ray photon flux causes a proportionate decrease in the magnitude of optical photon flux incident upon the detector element in a manner such that the total conductivity of detector element 10 is maintained at a substantially constant value.

It should be understood that, while a first terminal 20a of optical emitting means 20 is coupled to differential amplifier output 21a, the remaining optical emitting means terminal 20b may be coupled to ground potential (as shown in FIG. 1) or to any preselected potential (generally having maximum positive and negative limits equal to source voltages $+V_1$ and $-V_2$), via a suitable voltage divider (not shown) and the like, to establish the operating point of differential amplifier means 21) at a desired value. If the optical photon flux is established with detector element 10 shielded from X-rays, the resulting flux level is the total flux input operating point for detector element 10.

A photodiode 28, in series connection with an output resistor $R_0$, has an electrical potential, across the series combination, of polarity and magnitude sufficient to reverse-bias photodiode 28 and establish its operating point upon a linear region of the incident flux-photodiode current characteristic curve. Photodiode 28 serves to linearize the somewhat non-linear relationship between optical photon output of the LED 20 with respect to current flow I therethrough. Thus, while the greatest proportion of optical photons from optical photon emitting means 20 are directed in a "beam" 25a to detector element 10, photodiode 28 is positioned to receive a constant proportion i.e., optical photons 25b, of the total photons emitted by the LED. Thus, the detector system output voltage $V_{out}$ is determined by the resistance of resistor $R_0$ and the current flowing through photodiode 28, which current is essentially linearly proportional to the number of optical photons incident on detector element 10; the change in optical photon flux is essentially proportional to the magnitude of X-rays similarly incident thereon, whereby the detector system output is both highly linear and stable. It should be understood that the potential applied to the terminal of resistor $R_0$ furthest from photodiode 28 (which potential is illustrated herein as being ground potential) may be adjusted, in the same manner as previously described for the potential at optical emitting means 20b, to achieve the desired quiescent current, dynamic linearity and dynamic operating range characteristics for a particular photodiode.

Referring now to FIG. 4, wherein like reference designations are utilized for like elements, a preferred physical embodiment of the solid state X-ray flux detector system includes a header member 40 having a plurality of electrically conductive pins 42 passing therethrough. Detector element 10 is positioned spaced from header 40 and with a surface 11b to be illuminated by the X-ray flux substantially perpendicular to the plane of the header. Suitable electrical conductors 44 are fastened, by soldering, welding and the like processes, between electrodes 12a, 12b and a pair of pins 42, to which electrical connection to amplifier means 21 and bias resistor $R_1$ are facilitated. The leads of optical emitting means 20 and optical detector means 28 are respectively electrically connected to others of terminals 42.

Advantageously, the proportion of optical photons, emitted by source 20, incident upon detector means 28 is controlled by encapsulating emitter and detector in a member 46 of high optical-transmissivity materials having a highly reflective coating 47 deposited upon its surface, whereby all photons emitted from light emitting diode 20 either impinge upon detector means 28 or are transmitted as a "beam" 25a out of a first end 46a of the member. A light pipe 48, formed of a suitable rugged optically-transmissive material guides the photons of "beam" 25a from member end surface 46a to the surface 11b upon which the X-ray photon flux impinges. By suitable choice of the shape, length and refractive index of the material from which light pipe 48 is fabricated, total internal reflection may be achieved at the boundary surfaces of the light pipe, whereby essentially all of the photons in "beam" 25a impinge upon surface 11b, thereby preventing photon loss.

We have also found that the inclusion of a filter means 50, abutting member end surface 46a and light pipe 48, is useful for preventing extraneous surface excitation of the semiconductor member 11, which surface excitation is not matched by similar excitation responsive to the incident X-ray photon flux (reacting with the material of bar 11 at depths well below its surface). Filter 50 serves to adjust the spectral excitation distribution of photon emitting means 20 to achieve similar spatial distribution relative to the incident X-ray photon flux; the appearance of non-linear regions in the transfer characteristics of detector element 10 is thus prevented. Illustratively, use of a light emitting diode, for photon emitting means 20, having sufficiently short wavelength portions of its output spectral power distribution possessing energies greater than the band-gap of the material utilized in detector element 10, can seriously affect the X-ray to output voltage transfer characteristics of the detector system; filter means 50 is formed of a material having low transmissivity in the short wavelength regions desired to be excluded, whereby optical photon "beam" 52, passing through light pipe 48 to detector element 10, has a substantially attenuated number of photons of undesirable energy.

Alternatively, the incident X-ray photon flux may illuminate a surface 11a opposite that surface 11b of semiconductor bar 11 upon which the optical photon flux 52 is directed, although this embodiment does not achieve as desirable a spatial distribution of X-ray optical photon flux as the embodiment having both X-ray and optical photons impinging upon a single surface 11b.

In either embodiment, the detector system is advantageously encapsulated in a block 54 cast of a relatively rigid material, to further ruggedize the detector system, with header member 40 forming one end surface of the block. In the opposed-surfaces-illuminated embodiment, an upper face 54a of block 54 lies slightly below the plane of elongated semiconductor bar top surface 11a, to prevent attenuation of the incident X-ray photon flux. It should be understood that differential amplifier means 21 and resistors $R_0$ and $R_1$ may be positioned and rigidly maintained within block 54 with the associated electrical connections being facilitated to the inner ends of terminals 42 before encapsulation; this arrangement is particularly advantageous in that a detector system of generally rectangular physical shape results, whereby connection of electrical potentials and output load circuitry is facilitated by plugging the terminals 42 and header 40 into a suitable mating socket arrangement. This is particularly advantageous for use in systems, e.g., a computerized transaxial tomography detector array, wherein a large plurality, typically consisting of several hundred, of detector systems are arranged in side-by-side relationship along a geometric curve.

There has just been described a novel solid state radiation flux detector system utilizing negative feedback for maintaining the conductivity of a detector element at a substantially constant level to provide a system output which is highly linear with respect to changes in incident radiation (e.g. X-ray) flux.

While the present invention has been described with reference to a particular preferred embodiment thereof, many variations and modifications will now become apparent to those skilled in the art. In particular, other photon flux responsive semiconductor materials, hitherto considered insufficiently stable for use in detector systems, may be substituted for the sodium-doped cadmium selenide material described herein, with possible utilization of optical photons having wavelengths in other than the visible and/or near-infrared regions, such as the near-ultraviolet or vacuum-ultraviolet regions of the electromagnetic spectrum; other sources of optical photons, besides the light-emitting diode (normally emitting in the long-wavelength visible and near-infrared spectrum regions); and other forms of means for detecting ionizing radiations, such as fast charged particles or differing wavelength detection ranges, may accordingly be utilized without departing from the concept of the present invention. Accordingly, we do not intend to be limited solely by the subject matter disclosed herein, but only by the scope of the appended claims.

What is claimed is:

1. A system for detecting the magnitude of a flux of externally produced radiation, comprising:
    solid state radiation detector means for varying the magnitude of an electrical parameter responsive to the magnitude of a total incident flux of optical photons and externally produced radiation;
    first means for generating a flux of optical photons incident on said detector means;
    second means for causing the flux of said first means to vary responsive to changes in said electrical parameter to maintain the magnitude of said electrical parameter substantially constant at said detector means; and
    third means for monitoring said optical flux of said first means to generate a system output having a magnitude proportional to the flux of said externally produced radiation.

2. A system as set forth in claim 1, wherein said detector means comprises a member of a semiconductor material having an electrical parameter varying in response to the total incident radiation flux thereon, said member having a pair of opposed surfaces; and an electrode deposited upon each of said pair of surfaces.

3. A system as set forth in claim 2, wherein the varying electrical parameter is the conductivity of said semiconductor material between said electrodes.

4. A system as set forth in claim 3, wherein said externally produced radiation is a flux of X-ray photons and said semiconductor material is sodium-doped cadmium selenide.

5. A system as set forth in claim 1, wherein said first means is a light emitting diode generating said flux of optical photons responsive to a flow of current therethrough.

6. A system as set forth in claim 1, wherein said second means comprises:
    means for establishing a reference magnitude of said electrical parameter; and
    means for generating a signal having a magnitude related to the difference between the magnitude of said varying electrical parameter of said detector means and said reference magnitude, said signal being coupled to said first means for varying the magnitude of said flux of optical photons generated thereby.

7. A system as set forth in claim 6, wherein said varying electrical parameter is the conductance of said detector means, said reference magnitude establishing element is an electrical resistor.

8. A system as set forth in claim 7, wherein said signal generating means is a differential amplifier means having an input and an output, said detector means and said electrical resistance being coupled in parallel to said input, said output having thereat said signal related to the difference between the magnitude of said varying conductance of said detector means and the conductance of said electrical resistor.

9. A system as set forth in claim 1, wherein said third means is a photodiode receiving an essentially constant proportion of the optical photons emitted by said first means to generate a current therethrough having a magnitude essentially proportional to a change in said externally produced radiation incident upon said first means.

10. A system as set forth in claim 9, wherein said third means further comprises electrical resistance means in series with said photodiode for transforming said current flow through said photodiode to a voltage at said system output.

* * * * *